United States Patent
Choi et al.

(10) Patent No.: US 10,659,778 B2
(45) Date of Patent: May 19, 2020

(54) METHOD FOR ENABLING RANDOM ACCESS AND PLAYBACK OF VIDEO BITSTREAM IN MEDIA TRANSMISSION SYSTEM

(71) Applicant: Samsung Electronics Co., Ltd., Suwon-si, Gyeonggi-do (KR)

(72) Inventors: Byeong-Doo Choi, Suwon-si (KR); Kyung-Mo Park, Seoul (KR); Jae-Hyeon Bae, Seoul (KR); Young-Wan So, Gunpo-si (KR); Jae-Yeon Song, Seoul (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 15/767,606

(22) PCT Filed: Oct. 12, 2016

(86) PCT No.: PCT/KR2016/011422
§ 371 (c)(1),
(2) Date: Apr. 11, 2018

(87) PCT Pub. No.: WO2017/065491
PCT Pub. Date: Apr. 20, 2017

(65) Prior Publication Data
US 2018/0302618 A1 Oct. 18, 2018

(30) Foreign Application Priority Data
Oct. 12, 2015 (KR) .......................... 10-2015-0142468

(51) Int. Cl.
*H04N 19/70* (2014.01)
*H04N 19/114* (2014.01)
(Continued)

(52) U.S. Cl.
CPC ......... *H04N 19/114* (2014.11); *H04N 19/188* (2014.11); *H04N 19/30* (2014.11); *H04N 19/33* (2014.11); *H04N 21/00* (2013.01)

(58) Field of Classification Search
CPC .... H04N 19/114; H04N 21/00; H04N 19/188; H04N 19/33; H04N 19/30
See application file for complete search history.

(56) References Cited

U.S. PATENT DOCUMENTS

| 2005/0099869 A1* | 5/2005 | Crinon | ................... H04N 19/70 365/222 |
| 2005/0123274 A1* | 6/2005 | Crinon | ............. H04N 21/23424 386/241 |

(Continued)

FOREIGN PATENT DOCUMENTS

| JP | 2011-199745 A | 10/2011 |
| KR | 10-2013-0108154 A | 10/2013 |

(Continued)

*Primary Examiner* — Howard D Brown, Jr.
(74) *Attorney, Agent, or Firm* — Jefferson IP Law, LLP

(57) ABSTRACT

The present invention relates to a method of playing back a bitstream for transferring a group of pictures, the method comprising the steps of: parsing, when a random access occurs in a first picture, a network abstraction layer (NAL) unit header of at least one second picture following the first picture and determining a NAL unit type of the at least one second picture; removing the at least one second picture from the bitstream on the basis of the determined NAL unit type; and decoding and displaying the bitstream from which the at least one second picture has been removed.

11 Claims, 5 Drawing Sheets

(51) Int. Cl.
*H04N 19/33* (2014.01)
*H04N 21/00* (2011.01)
*H04N 19/30* (2014.01)
*H04N 19/169* (2014.01)

(56) References Cited

U.S. PATENT DOCUMENTS

| | | | |
|---|---|---|---|
| 2005/0135783 A1* | 6/2005 | Crinon | H04N 21/23424 386/344 |
| 2005/0152448 A1* | 7/2005 | Crinon | H04N 21/23424 375/240.01 |
| 2008/0205511 A1* | 8/2008 | Hannuksela | H04L 65/607 375/240.01 |
| 2012/0230401 A1* | 9/2012 | Chen | H04N 21/44016 375/240.12 |
| 2013/0077677 A1 | 3/2013 | Wang et al. | |
| 2013/0235152 A1* | 9/2013 | Hannuksela | H04N 19/597 348/43 |
| 2013/0251333 A1 | 9/2013 | Berbecel et al. | |
| 2014/0192882 A1* | 7/2014 | Wang | H04N 19/70 375/240.16 |
| 2015/0085938 A1* | 3/2015 | Hendry | H04N 19/188 375/240.25 |
| 2015/0172667 A1* | 6/2015 | Hendry | H04N 19/105 375/240.25 |
| 2016/0127728 A1* | 5/2016 | Tanizawa | H04N 19/30 375/240.02 |
| 2017/0094288 A1* | 3/2017 | Hannuksela | H04N 19/105 |

FOREIGN PATENT DOCUMENTS

| | | |
|---|---|---|
| KR | 10-2014-0085460 A | 7/2014 |
| KR | 10-1528269 B1 | 6/2015 |
| KR | 10-2015-0104172 A | 9/2015 |

* cited by examiner

METHOD FOR ENABLING RANDOM ACCESS AND PLAYBACK OF VIDEO BITSTREAM IN MEDIA TRANSMISSION SYSTEM

CROSS-REFERENCE TO RELATED APPLICATION(S)

This application is a U.S. National Stage application under 35 U.S.C. § 371 of an International application number PCT/KR2016/011422, filed on Oct. 12, 2016, which is based on and claimed priority of a Korean patent application number 10-2015-0142468, filed on Oct. 12, 2015, in the Korean Intellectual Property Office, the disclosure of which is incorporated by reference herein in its entirety.

BACKGROUND

1. Field

The present disclosure generally relates to a media playback method in a real-time multimedia transport protocol, and more particularly, to a method for reproducing media faster by accessing a random point in a bitstream transmitted by a moving picture experts group (MPEG) media transport (MMT) protocol.

2. Description of the Related Art

Upon occurrence of random access to a point corresponding to stream access point (SAP) type 2 or SAP type 3 in the MMT, a terminal may reconstruct an intra random access point (IRAP) picture.

After the terminal decodes all leading pictures related to the reconstructed IRAP picture, the terminal displays the leading pictures in a display order and then displays the IRAP picture. That is, upon occurrence of random access, as long a delay as a time taken for the terminal to decode the related leading pictures is generated.

Accordingly, upon occurrence of random access due to channel switching or bitstream switching, as long a delay as the number of the leading pictures (due to decoding and/or displaying) is involved in reconstructing the IRAP picture at the terminal.

SUMMARY

According to the present disclosure, a method for reducing a delay caused by decoding of leading pictures, when a terminal randomly accesses a bitstream is provided.

According to the present disclosure, a method for ensuring presentation time (PT) synchronization, when a delay involved in random access of a terminal to a bitstream is reduced.

The present disclosure proposes a method of playing back a bitstream delivering a group of pictures (GOP), which includes, upon occurrence of random access to a first picture, determining a network abstraction layer (NAL) unit type of at least one second picture following the first picture by parsing a NAL unit header of the at least one second picture, removing the at least one second picture from the bitstream based on the determined NAL unit type, and decoding the bitstream from which the at least one second picture has been removed, and displaying the decoded bitstream.

The present disclosure proposes an apparatus for playing back a bitstream delivering a GOP, which includes a transceiver configured to receive the bitstream, and a controller configured to, upon occurrence of random access to a first picture, determine a NAL unit type of at least one second picture following the first picture by parsing a NAL unit header of the at least one second picture, to remove the at least one second picture from the bitstream based on the determined NAL unit type, and to decode the bitstream from which the at least one second picture has been removed, and display the decoded bitstream.

The present disclosure proposes a method of playing back a bitstream in a terminal, which includes, upon occurrence of random access to a random access point (RAP) of SAP type 2 or SAP type 3, determining whether a leading picture exists by parsing a NAL unit header in the bitstream, in the presence of a leading picture, removing NAL unit data corresponding to the leading picture before decoding, and decoding and displaying a following trail picture.

Further, the present disclosure proposes a method in which when leading pictures are removed, and an IRAP picture and a trail picture are displayed, composition PTs of the IRAP picture and the trail picture are advanced by the number of the leading pictures.

Further, the present disclosure proposes a method further including decoding the IRAP picture, displaying the IRAP picture ahead by the number of the leading pictures, and displaying the IRAP picture repeatedly as many times as the number of the leading pictures.

According to the present disclosure, upon occurrence of random access to a video stream, in the presence of leading pictures following an IRAP picture in a bitstream, the leading pictures may be processed and a video sequence may be displayed. Thus, a terminal according to the present disclosure may perform fast random access playback, and randomly access a bitstream of SAP type 2 or SAP type 3.

Upon occurrence of random access to a RAP corresponding to SAP type 2 or SAP type 3, the terminal according to the present disclosure may determine the presence or absence of leading pictures by parsing a NAL unit header in a video bitstream. In the presence of leading pictures, the terminal may fast decode and display a following trail picture by discarding NAL unit data corresponding to the leading pictures before decoding.

When discarding the leading pictures and displaying the IRAP picture and the trail picture, the terminal according to the present disclosure may advance an existing composition PT of a decoded picture, received from a server by the number of the leading pictures.

After discarding the leading pictures and decoding the IRAP picture, the terminal according to the present disclosure may immediately display the IRAP picture, ahead by the number of the leading pictures, repeatedly display the IRAP picture as many times as the number of the leading pictures, and then decode and display the trail picture.

DETAILED DESCRIPTION

Embodiments of the present disclosure will be described below in detail with reference to the attached drawings. A detailed description of a generally known function or structure of the present disclosure will be avoided lest it should obscure the subject matter of the present disclosure. Although the terms used in the present disclosure are defined in consideration of functions in the embodiments of the present disclosure, the terms may be changed according to the intention of a user or an operator, or customs. Therefore, the present disclosure should be understood, not simply by the actual terms used but by the meanings of each term lying within.

Before a detailed description of the present disclosure, some terms used in the present disclosure may be interpreted as, but not limited to, the following meanings.

A server is an entity communicating with a user equipment, which may be referred to as a base station (BS), a Node B (NB), an eNode B (eNB), an access point (AP), or the like.

A user equipment is an entity communicating with a BS, which may be referred to as a UE, a mobile station (MS), a mobile equipment (ME), a device, a terminal, or the like.

A moving picture experts group (MPEG) media transport (MMT) system supporting only type 1 among six SAP types defined in the ISO base media file format (ISOBMFF) sets the first sample of each media processing unit (MPU) as a random access point (RAP) access unit (AU), and indicates the presentation time (PT) of the first AU by a signaling message.

Although SAP type 1 is the most popular random access method, SAP type 1 does not support the advantages of fast access and high coding efficiency, which SAP type 2 to SAP type 6 have. Particularly, SAP type 2 and SAP type 3 enable a higher coding gain than SAP type 1 through an open GOP by leading picture handling such as clean random access (CRA) and broken link access (BLA) defined in high efficiency video coding (HEVC). Herein, a leading picture refers to a picture preceding a specific picture in a display order.

FIG. 1 is a view illustrating decoding and displaying of a CRA picture in a GOP in relation to leading pictures.

Figure 1A:
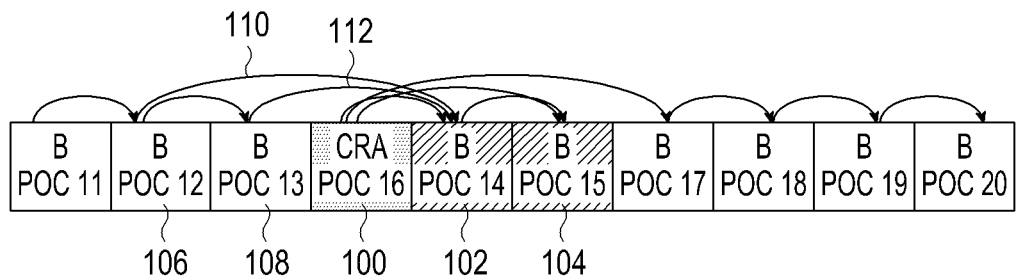
FIG. 1 is a view illustrating decoding and displaying of a clean random access (CRA) picture in a group of pictures (GOP) in relation to leading pictures.
Figure 1B:
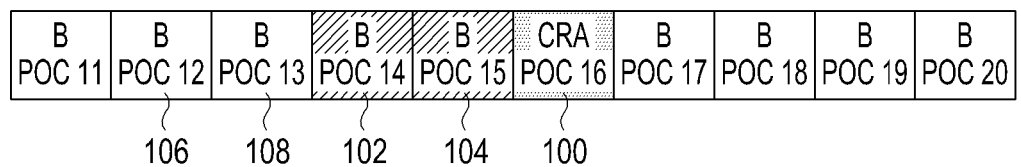

FIG. 1(a) is a view illustrating a decoding order of pictures, and FIG. 1(b) is a view illustrating a display order of the pictures. FIG. 1 illustrates a case in which although a UE decodes a CRA picture 100, a B picture 102, and a B picture 104 in this order, the UE displays the B picture 102, the B picture 104, and the CRA picture 100 in this order, by way of example. The B picture 102 and the B picture 104 may be leading pictures of the CRA picture 100. Herein, picture of counts (POCs) may be understood as values indicating the display order of the pictures. The B picture 102 may have POC 14, the B picture 104 may have POC 15, and the CRA picture 100 may have POC 16.

The CRA picture 100 has the following characteristics. The CRA picture 100 is a picture that facilitates the start of decoding immediately, when the CRA picture 100 is indicated as a random access point in the middle of a coded video sequence. Compared to instantaneous decoding refresh (IDR), the CRA technique has an improved coding efficiency (by about 6%). The CRA technique enables related leading pictures (for example, the B picture 102) of the CRA picture 100 to use decoded pictures (for example, a B picture 106 and a B picture 108) previous to the CRA picture 100 as references. In FIG. 1(a), curved arrows 110 and 112 indicate that the B picture 102 uses the previous decoded pictures 106 and 108 as references. If the CRA picture 100 is randomly accessed, pictures following the CRA picture 100 in the decoding order and output order (or display order) are decodable.

For example, characteristics of SAP types defined in the ISOBMFF are listed in the following table.

TABLE 1

Type 1: TEPT = TDEC = TSAP = TPTF (TRAP without leading pictures)
Type 2: TEPT = TDEC = TSAP < TPTF (IDR with leading pictures)
Type 3: TEPT < TDEC = TSAP <= TPTF (CRA/BLA with leading pictures)
Type 4: TEPT <= TPTF < TDEC = TSAP (Gradual decoding refresh)
Type 5: TEPT = TDEC < TSAP
Type 6: TEPT < TDEC < TSAP In [Table 1], TSAP represents a total decodable time after a specific PT, TDEC represents the earliest of the PTs of decodable pictures, TEPT represents the earliest of the PTs of decodable/non-decodable pictures, and TPTF represents the PT of an RAP.

For example, RAP types defined in HEVC are listed in the following table.

TABLE 2

| IDR | Instantaneous decoding refresh | IDR_W_LP: IDR with leading pictures<br>IDR_N_LP: IDR without leading pictures |
|---|---|---|
| BLA | Broken link access | BLA_W_LP: BLA with leading pictures<br>BLA_W_DLP: BLA with decodable leading pictures<br>BLA_N_LP: BLA without leading pictures |
| CRA | Clean random access | CRA with leading pictures |

For example, the types of leading pictures defined in HEVC are listed in the following table.

TABLE 3

| RADL | Decodable leading pictures | RADL_R: RADL referenced<br>RADL_N: RADL non-referenced |
|---|---|---|
| RASL | Non-decodable leading pictures | RASL_R: RASL referenced<br>RASL_R: RASL non-referenced |

Figure 2:
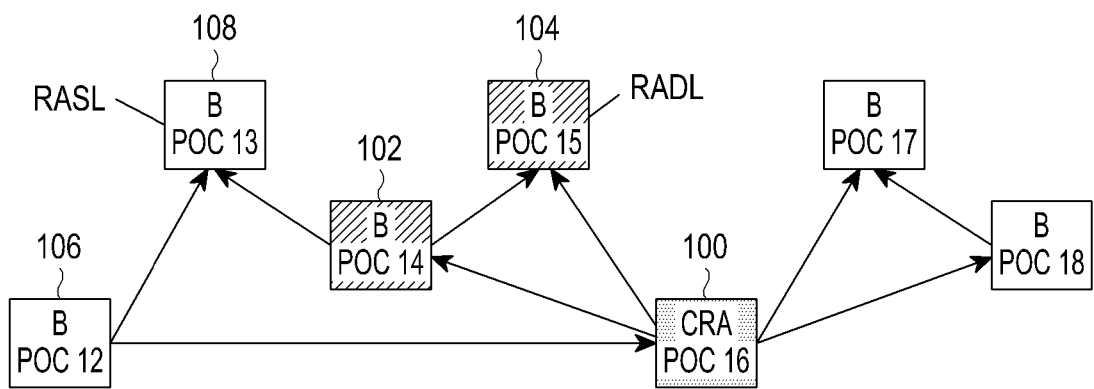
FIG. 2 is a view depicting a relationship between random access skipped leading (RASL) pictures and random access decodable leading (RADL) pictures.

FIG. 2 is a view depicting a relationship between random access skipped leading (RASL) pictures and random access decodable leading (RADL) pictures.

An RADL picture and an RASL picture have the following characteristics. When decoding starts with an RAP picture, an RADL picture is a picture that is decodable accurately. When the RAP picture is randomly accessed, an RASL picture is a picture that is not decodable accurately. If some picture is a leading picture, the leading picture may be an RADL or RASL picture. In FIG. 2, if the RAP picture is the CRA picture 100, the B picture 102 and the B picture 104 are decodable pictures, that is, RADL pictures because the B picture 102 and the B picture 104 are decoded after the CRA picture 100. On the contrary, the B picture 102 and the B picture 108 are pictures that are to be decoded before the CRA picture 100. Thus, if the RAP picture is the CRA picture 100, the B picture 102 and the B picture 108 are non-decodable pictures, that is, RASL pictures.

As described before, if random access occurs to a picture corresponding to SAP type 2 (that is, an IDR picture with leading pictures) or SAP type 3 (that is, a CRA or BLA picture with leading pictures) in MMT, the UE decodes all of leading pictures related to the randomly accessed picture (that is, IRAP picture), and then displays the leading pictures in a display order and the IRAP picture. Accordingly, the UE experiences a delay due to the leading pictures until the picture is displayed.

FIG. 3 illustrates an exemplary delay until an IRAP picture is displayed.

Figure 3A:
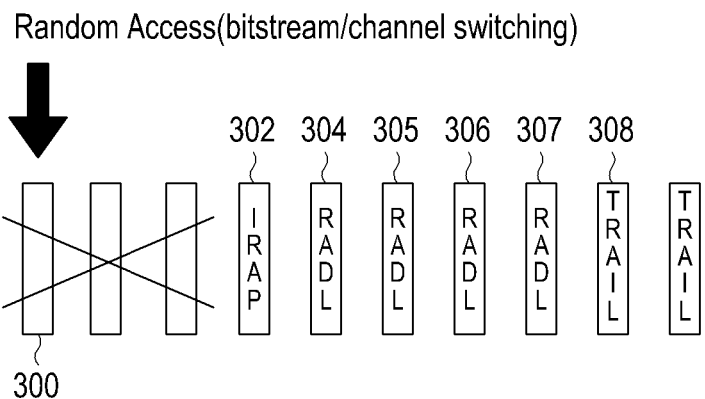
FIG. 3 is an exemplary view illustrating a delay until an intra random access point (IRAP) picture is displayed.
Figure 3B:
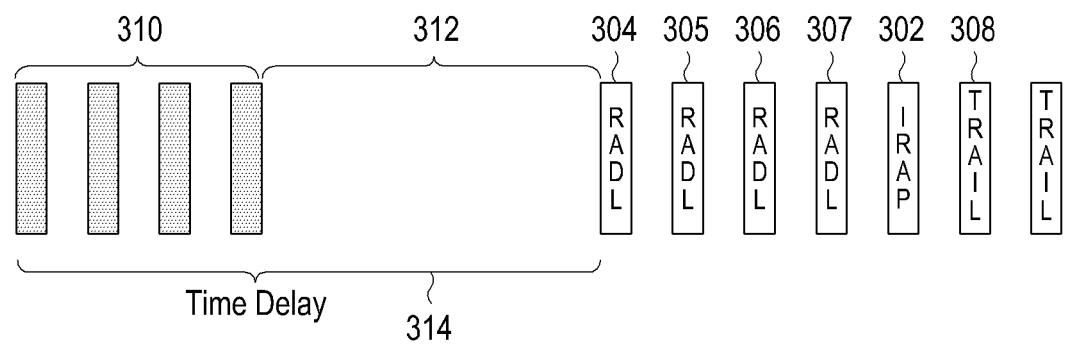

FIG. 3(a) illustrates an exemplary decoding order, and FIG. 3(b) illustrates an exemplary display order. If random access occurs to a first picture 300 in a bitstream but the first picture 300 is a non-random accessible picture, a delay 310 may be generated until a random accessible IRAP picture 302 is decoded. Further, the UE should decode leading pictures 304, 305, 306, and 307 related to the IRAP picture 302. As a result, as long a delay 312 as a time required to decode the related leading pictures 304, 305, 306, and 307 may be generated. For example, if random access occurs due to channel switching or bitstream switching, as long a time delay as the number of the leading pictures may be generated for the UE to play back the IRAP picture. Only when a time delay 314 elapses, the UE may display the leading pictures 304, 305, 306, and 307 and then the IRAP picture 302. Herein, a trail picture 308 refers to a picture that is decoded and displayed irrespective of the IRAP picture 302.

The present disclosure proposes a technique (method and apparatus) for reducing a time delay of random access, caused by playback (that is, decoding and display) of leading pictures.

A first technique of the present disclosure is to discard leading pictures in a bitstream.

FIG. 4 is an exemplary view illustrating a technique of removing leading pictures in a bitstream.

Figure 4A:
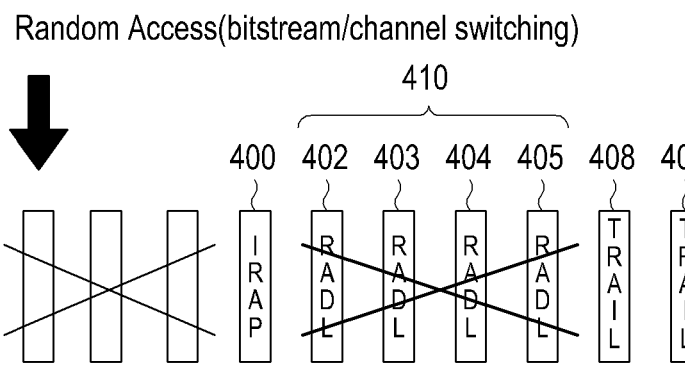
FIG. 4 is an exemplary view illustrating a technique for removing leading pictures in a bitstream.
Figure 4B:
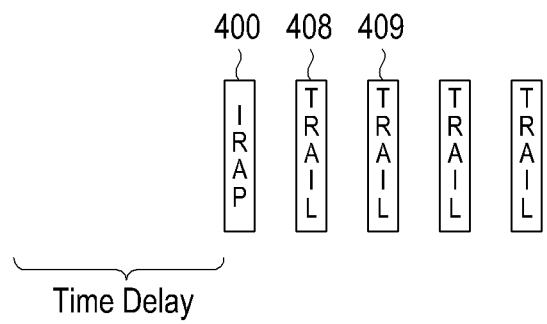

FIG. 4(a) is a view illustrating a decoding order of pictures, and FIG. 4(b) is a view illustrating a display order of the pictures.

In this technique, upon occurrence of random access, the UE discards some pictures (that is, leading pictures of a randomly accessed IRAP picture) without displaying the pictures.

Specifically, upon occurrence of random access, the UE may determine whether leading pictures 402, 403, 404, and 405 exist by a network abstraction layer (NAL) unit type (NUT) recorded in a NAL unit header (NUH) in each picture. In the case of a HEVC bitstream, trail pictures 408 and 409 following an RAP picture do not have dependency on the leading pictures 402, 403, 404, and 405. Thus, even though the leading pictures 402, 403, 404, and 405 such as RADL and RASL pictures are all discarded in the bitstream, decoding of the trail pictures 408 and 409 is not affected. Accordingly, in this technique, the UE may eliminate a time delay caused by decoding of the leading pictures 402, 403, 404, and 405 by discarding the leading pictures 402, 403, 404, and 405 in the bitstream before decoding illustrating. In this manner, the UE of this technique may fast reconstruct (decode and display) the trail pictures 408 and 409 following an IRAP picture 400 as well as the IRAP picture 400.

Specifically, the types of the IRAP picture, the leading pictures (for example, RADL and RASL), and the trail pictures may be identified by the NUT of the encoded bitstream. For example, a picture type may be signaled in 6 NUT bits of an NUH in HEVC. Further, in the case of a HEVC bitstream stored in the ISOBMFF, the UE may identify NUT information per NAL unit in HEVCDecoderConfigurationRecord of HEVCConfigurationBox.

The UE may remove the leading pictures in the bitstream based on the NUT information, and immediately display the IRAP picture and the trail pictures (without a time delay caused by decoding and display of the leading pictures).

Herein, the UE may calculate a delay time 410 as long as the number of the leading pictures 402, 403, 404, and 405, and thus display the trail pictures 408 and 409, advancing the composition PTs of the trail pictures by the calculated display time 410. That is, the UE is capable of displaying the IRAP picture 400 without the need for decoding the leading pictures 402, 403, 404, and 405, after decoding the IRAP picture 400, and may decode and display the trail pictures 408 and 409 immediately after the IRAP picture 400.

In the foregoing first technique, if the UE displays the IRAP picture and then the trail pictures immediately, the PTs of all of the following pictures should be advanced. In the case where a plurality of devices present the bitstream, if the bitstream is changed for the reason that the PTs of some pictures are advanced, presentation synchronization may not be acquired between the devices. In this context, a second technique of the present disclosure is to immediately display only the IRAP picture without advancing the PTs of the trail pictures to be displayed next to the IRAP picture. In the second technique, after the UE repeatedly displays the IRAP picture during a display time of the leading pictures, the UE may display the following decoded trail pictures at the original PTs of the trail pictures.

FIG. 5 is an exemplary view illustrating a technique of removing leading pictures in a bitstream and repeatedly displaying an IRAP picture.

Figure 5A:
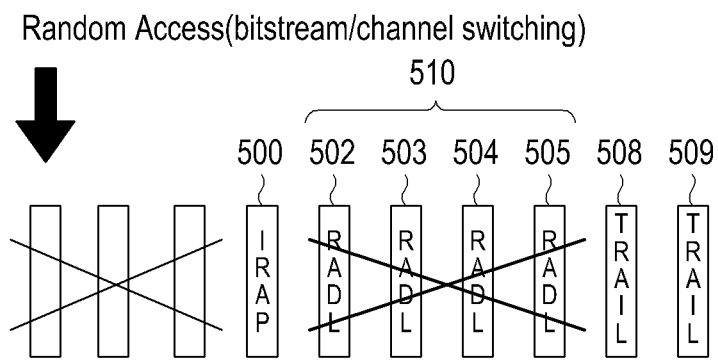
FIG. 5 is an exemplary view illustrating a technique for removing leading pictures in a bitstream and repeatedly displaying an IRAP picture.
Figure 5B:
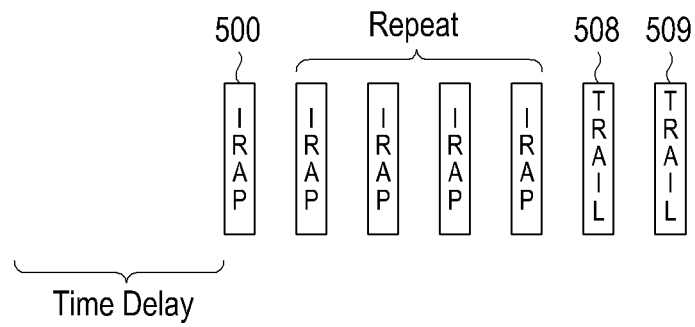

FIG. 5(a) is a view depicting a decoding order of pictures, and FIG. 5(b) is a view depicting a display order of the pictures.

In this technique, upon occurrence of random access, the UE discards some pictures stored in a DPB (that is, leading pictures of a randomly accessed IRAP picture), without displaying the pictures.

Specifically, upon occurrence of random access, the UE may determine whether leading pictures 502, 503, 504, and 505 exist by an NUT recorded in an NUH in each picture. In the case of a HEVC bitstream, trail pictures 508 and 509 following an RAP picture do not have dependency on the leading pictures 502, 503, 504, and 505. Thus, even though the leading pictures 502, 503, 504, and 505 such as RADL and RASL pictures are all discarded, decoding of the trail pictures 508 and 509 is not affected. Accordingly, in this technique, the UE may eliminate a time delay caused by decoding of on the leading pictures 502, 503, 504, and 505 by discarding on the leading pictures 502, 503, 504, and 505 in the bitstream before decoding. In this manner, the UE of this technique may fast reconstruct (decode and display) the IRAP picture 400.

Specifically, the types of the IRAP picture, the leading pictures (for example, RADL and RASL), and the trail pictures may be identified by the NUT of the encoded bitstream. For example, the types may be signaled in 6 NUT bits of the NUH in HEVC. Further, in the case of a HEVC bitstream stored by ISOBMFF, the UE may identify NUT information per NAL unit in HEVCDecoderConfigurationRecord of HEVCConfigurationBox.

The UE may discard the leading pictures in the bitstream based on the NUT information, and immediately display the IRAP picture and the trail pictures (without a time delay caused by decoding and display of the leading pictures).

Herein, the UE may repeatedly display the IRAP picture during a display time 510 as long as the number of the leading pictures 502, 503, 504, and 505. The UE may display the trail pictures 508 and 509 at existing composition PTs of the trail pictures 508 and 509, indicated by a server. That is, the UE is capable of displaying the IRAP picture 400 immediately after decoding the IRAP picture 400 without the need for decoding the leading pictures 402, 403, 404, and 405, and may display the trail pictures 408 and 409 at the composition PTs, thereby preventing the problem of asynchronization.

In this case, even though the UE may not advance the PTs of all other trail pictures 508, the UE may advance the PT of the TRAP picture 500 by eliminating a time delay. Therefore, the UE has the effect of displaying a first picture as early as possible, upon occurrence of random access caused by channel switching or the like. That is, the phenomenon that no screen is displayed during a time delay may be prevented.

Figure 6:
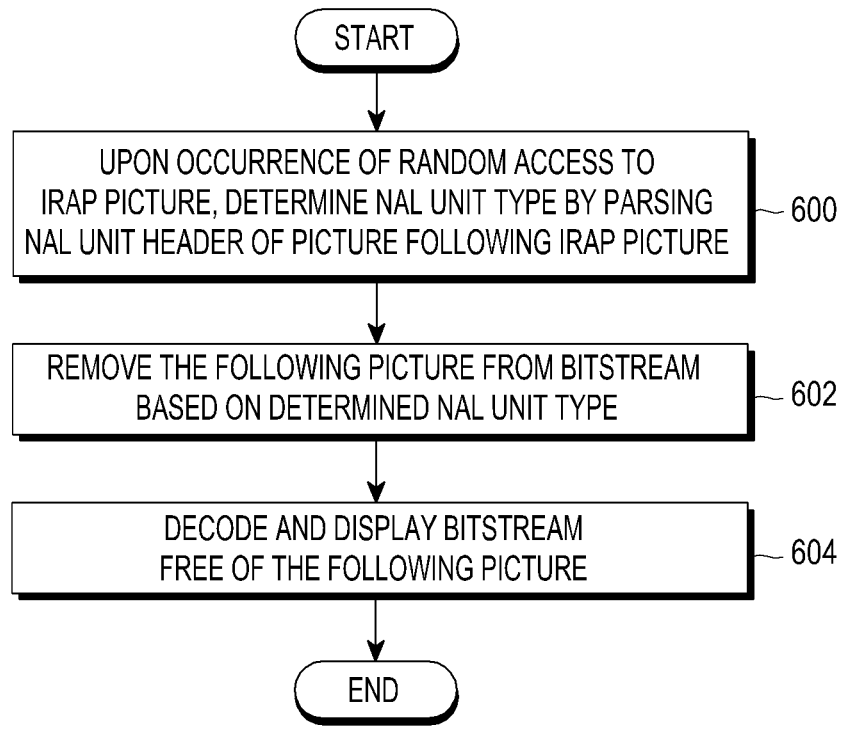
FIG. 6 is an exemplary view illustrating a bitstream playback method supporting random access of a user equipment (UE) according to the present disclosure.

FIG. 6 is an exemplary view illustrating a bitstream playback method supporting random access of a UE according to the present disclosure.

Upon occurrence of random access to a first picture (for example, an IRAP picture such as a CRA picture), the UE may determine the NUT(s) of a second picture(s) following the first picture by parsing the NUT(s) of the second picture(s) (600). For example, if bitstream switching or transmission channel switching occurs, random access may occur to a bitstream.

The UE may discard the second pictures from the bitstream based on the determined NUTs (602). The second pictures may be leading pictures before the first picture in a display order. For example, the NUTs of the second pictures may indicate RADL or RASL.

The UE may decode and display the first picture and trail pictures following the first picture in the bitstream from which the second pictures have been discarded (604). As the second pictures corresponding to the leading pictures are removed from the bitstream, a display PT of the first picture may be earlier than a composition PT of the first picture. Specifically, the first picture may be displayed, earlier than the composition PT by a time required to reconstruct the second pictures.

Display PTs of the trail pictures may or may not be advanced. For example, if the first picture is repeatedly displayed for the time required to reconstruct the second pictures, the PTs of the trail pictures may not be advanced.

Figure 7:
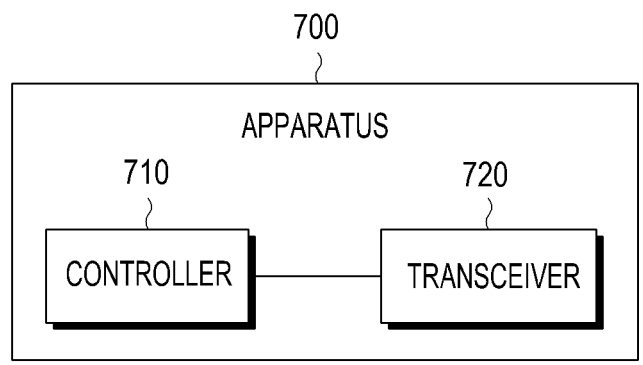
FIG. 7 is a block diagram of a UE that plays back a GOP transmission bitstream according to embodiments of the present disclosure.

FIG. 7 is a block diagram of a UE for playing back a GOP transmission bitstream according to embodiments of the present disclosure.

A UE 700 may include a transceiver 720 that receives a bitstream from another communication device or a network entity, and a controller 710 that provides overall control to the UE 700. In the first and second techniques of the present disclosure, all of the afore-described operations of the UE may be understood as performed under control of the controller 710. However, the controller 710 and the transceiver 720 are not necessarily configured separately. Instead, the controller 710 and the transceiver 720 may be incorporated into one component such as a single chip.

It is to be noted that the exemplary picture decoding/display diagrams, the exemplary views illustrating the methods, and the block diagram of an apparatus, illustrated in FIGS. 1 to 7 are not intended to limit the scope of the present disclosure. That is, a specific picture or a specific component illustrated in FIGS. 1 to 7 should not be interpreted as mandatory for implementation of the present disclosure, and the present disclosure may be implemented even with a part of the components without departing from the scope and spirit of the present disclosure.

The afore-described operations may be performed by providing a memory device storing a corresponding program code in a component of an entity, function, BS, or UE in a communication system. That is, a controller of the an entity, function, BS, or UE may perform the afore-described operations by reading the program code stored in the memory device and executing the program code by a processor or a central processing unit (CPU).

Various components and modules of an entity, function, BS, or UE described in the present disclosure may operate using hardware circuits such as a combination of a hardware circuit such as a complementary metal oxide semiconductor-based logic circuit, firmware, and software and/or hardware and firmware and/or software embedded in a machine-readable medium. For example, various electrical structures and methods may be implemented using electrical circuits such as transistors, logic gates, and ASICs.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method of playing back a bitstream delivering a group of pictures (GOP), the method comprising:
upon occurrence of random access to a first picture, determining a network abstraction layer (NAL) unit type of at least one second picture following the first picture by parsing a NAL unit header of the at least one second picture;
removing the at least one second picture from the bitstream based on the determined NAL unit type; and
decoding the bitstream from which the at least one second picture has been removed, and displaying the decoded bitstream,
wherein, during displaying the decoded bitstream, the first picture is additionally displayed repeatedly for a reconstruction time corresponding to a number of the at least one second picture and a time required to reconstruct the at least one second picture.

2. The method of claim 1, wherein a composition presentation time (PT) of the first picture is advanced by the reconstruction time corresponding to the number of the at least one second picture.

3. The method of claim 1, wherein if the NAL unit type indicates that the at least one second picture is a leading picture of the first picture, the at least one second picture is removed from the bitstream.

4. The method of claim 3, wherein the NAL unit type of the at least one second picture is random access decodable leading (RADL) or random access skipped leading (RASL).

5. The method of claim 1, wherein the first picture is a clean random access (CRA) picture having at least one leading picture.

6. The method of claim 1, wherein the random access is caused by switching of the bitstream.

7. An apparatus for playing back a bitstream delivering a group of pictures (GOP), the apparatus comprising:
a transceiver configured to receive the bitstream; and
a controller configured to:
upon occurrence of random access to a first picture, determine a network abstraction layer (NAL) unit type of at least one second picture following the first picture by parsing a NAL unit header of the at least one second picture, remove the at least one second picture from the bitstream based on the determined NAL unit type, and decode the bitstream from which the at least one second picture has been removed, and display the decoded bitstream, wherein, during displaying the decoded bitstream, the controller is further configured to additionally display the first picture repeatedly for a reconstruction time corresponding to a number of the at least one second picture and a time required to reconstruct the at least one second picture.

8. The apparatus of claim 7, wherein the controller is further configured to advance a composition presentation time (PT) of the first picture by the reconstruction time corresponding to the number of the at least one second picture.

9. The apparatus of claim 7, wherein if the NAL unit type indicates that the at least one second picture is a leading picture of the first picture, the controller is configured to remove the at least one second picture from the bitstream.

10. The apparatus of claim 9, wherein the NAL unit type of the at least one second picture is random access decodable leading (RADL) or random access skipped leading (RASL).

11. The apparatus of claim 7, wherein the first picture is a clean random access (CRA) picture having at least one leading picture.

\* \* \* \* \*